(12) United States Patent
Bergh et al.

(10) Patent No.: US 11,086,184 B1
(45) Date of Patent: Aug. 10, 2021

(54) ELECTROCHROMIC DEVICES HAVING OPTIMIZED VISUAL CHARACTERISTICS

(71) Applicant: Kinestral Technologies, Inc., South San Francisco, CA (US)

(72) Inventors: William S. Bergh, South San Francisco, CA (US); Jonathan Ziebarth, South San Francisco, CA (US); John Bass, South San Francisco, CA (US); Howard Turner, South San Francisco, CA (US)

(73) Assignee: KINESTRAL TECHNOLOGIES, INC, Hayward, CA (US)

( * ) Notice: Subject to any disclaimer, the term of this patent is extended or adjusted under 35 U.S.C. 154(b) by 0 days.

(21) Appl. No.: 15/492,739

(22) Filed: Apr. 20, 2017

Related U.S. Application Data

(60) Provisional application No. 62/325,371, filed on Apr. 20, 2016.

(51) Int. Cl.
*G02F 1/163* (2006.01)
*E06B 9/24* (2006.01)

(52) U.S. Cl.
CPC ............. *G02F 1/163* (2013.01); *E06B 9/24* (2013.01); *E06B 2009/2464* (2013.01)

(58) Field of Classification Search
CPC ........ G02F 1/15; G02F 1/1523; G02F 1/1525; G02F 1/153; G02F 1/1533; G02F 1/155; G02F 1/163; G02F 2001/1515; G02F 2001/1635; C09K 9/02; H05B 33/145; E06B 3/64; E06B 3/66; E06B 3/663; G02B 1/00; B60R 1/088

USPC .................... 359/265, 275; 345/105
See application file for complete search history.

(56) References Cited

U.S. PATENT DOCUMENTS

| | | | | |
|---|---|---|---|---|
| 5,792,559 A * | 8/1998 | Heithoff | ........... | B32B 17/10339 |
| | | | | 156/297 |
| 6,373,618 B1 * | 4/2002 | Agrawal | ............... | G02F 1/1503 |
| | | | | 359/265 |
| 6,643,050 B2 * | 11/2003 | Rukavina | ............... | G02F 1/1533 |
| | | | | 359/265 |
| 7,301,687 B2 * | 11/2007 | Berggren | ................. | C09K 9/02 |
| | | | | 359/265 |
| 8,284,473 B2 * | 10/2012 | Reynolds | ................. | G02F 1/15 |
| | | | | 359/273 |
| 8,947,759 B2 * | 2/2015 | Greer | .................... | G02F 1/1523 |
| | | | | 359/275 |
| 9,022,583 B2 * | 5/2015 | Neuman | ................... | G02B 1/10 |
| | | | | 359/512 |
| 9,091,898 B2 * | 7/2015 | Greer | .................... | G02F 1/1523 |

(Continued)

*Primary Examiner* — Wen Huang
(74) *Attorney, Agent, or Firm* — Womble Bond Dickinson (US) LLP

(57) ABSTRACT

The current invention describes an electrochromic panel having optimized visual properties. The properties have been optimized to provide an electrochromic panel having a very transparent clear state and a very black and opaque dark state. The coloration of the electrochromic panel has also been optimized to provide options for aesthetically pleasing windows. In one embodiment, the clear state comprises a CIE-Lab L* in transmission from 70 to 95, b* in transmission from −8 to 8, and a* in transmission from −4 to 4 and a dark state comprises a Tvis less than 0.01%, a CIE-Lab b* in transmission from −8 to 8, and a CIE-Lab a* in transmission from −8 to 8.

23 Claims, 12 Drawing Sheets

(56) References Cited

U.S. PATENT DOCUMENTS

| | | | |
|---|---|---|---|
| 9,563,097 B2* | 2/2017 | Ziebarth | B60R 1/088 |
| 9,581,877 B2* | 2/2017 | Bass | G02F 1/155 |
| 9,684,219 B2* | 6/2017 | Garcia | G02F 1/1533 |
| 9,902,804 B2* | 2/2018 | Reynolds | C08G 61/123 |
| 2002/0044331 A1* | 4/2002 | Agrawal | H01M 14/005 |
| | | | 359/265 |
| 2014/0354940 A1* | 12/2014 | Lam | G02B 5/23 |
| | | | 351/44 |

* cited by examiner

|  | Switching Time | Current Limit | Max Source Voltage | Peak Power | Energy to Switch |
|---|---|---|---|---|---|
| Row 1 | Uniform TCO 15 Ω/m | 17 Min | - | 7.5 V | 9 W | 0.3 W-hr |
| Row 2 | Gradient TCO 15-450 Ω/m | 5 Min | 1.5 A | 15 V | 23 W | 0.75 W-hr |
| Row 3 | Gradient TCO 15-450 Ω/m | 6 Min | 1 A | 11 V | 11 W | 0.6 W-hr |

FIG. 9

ELECTROCHROMIC DEVICES HAVING OPTIMIZED VISUAL CHARACTERISTICS

FIELD OF THE INVENTION

The present invention generally relates to switchable electrochromic devices and panels, such as architectural windows. More particularly, and in one embodiment, the present invention is directed to switchable electrochromic devices that have particular values of CIE-Lab b* and visible transmittance in the clear and dark states, and are capable of uniform visible transitions between the clear state and the dark state.

BACKGROUND

Electrochromic devices are devices that change color state when an electrical current is applied and can switch back and forth between those different color states. Once an electrochromic device has been switched into a state it will remain in that state even after any applied electrical current or voltage is removed. The change in color state may be between different colors, including switching between a mirror state or a transparent state or a translucent state. Electrochromic devices are capable of being tinted from a low transparency state to many different intermediate translucent (or semi-transparent) states to high transparency states. Historically this technology has been difficult to scale to large size window glass for architectural or transportation usage. This is because in larger scale electrochromic devices an "iris" effect is pronounced, where the device changes color more quickly towards the outside edge and more slowly towards the center of the device. This is not appealing to use in buildings, or in transportation vehicles using larger substrates such as automotive window, buses, trains, or boats. Additionally, larger scale electrochromic devices have slow switching speeds when transitioning between states.

Many of the historical electrochromic devices also have drawbacks in their coloration properties. Often the dark state of an electrochromic device (e.g., for use in an automotive application, or an architectural window) has a distinctly blue color and the clear state is hazy or has a yellow color. This problem is caused by the electrochromic materials in the device absorbing light preferentially in one portion of the spectrum. One solution to mitigate the undesirable color of electrochromic devices is to incorporate a colored filter into the device offset the color of the electrochromic material and produce a neutral colored device. However, this solution has the undesirable consequence of reducing the overall transparency of the device in the clear state, because the filter operates by absorbing incident light in a portion of the spectrum.

Due to their insufficient coloration properties, electrochromic devices have not commonly been used for privacy applications where the exterior or interior windows or partitions are required to substantially prevent others from seeing through the window and distinguish people or objects on the other side. Polymer dispersed liquid crystal (PDLC) and suspended particle display (SPD) technologies have been used in privacy applications. Each of these technologies has drawbacks. PDLC has to be turned off for up to four hours a day for rejuvenation, which is an inconvenience to users and makes the technology impractical for many applications. Additionally, PDLC has a hazy clear state making it impractical for applications where transparent windows are desired. Another drawback to the PDLC technology is that if a PDLC device loses power it will not stay in its state, meaning that if it is tinted for privacy it will no longer provide privacy and become translucent. Also, PDLC devices only have two states, either on or off, switching between an opaque privacy state and a translucent state. Suspended particle devices (SPD) are limited to only one color in the dark state, that being blue. Both PDLC and SPD technologies require constant electricity to maintain their state, which is not energy efficient.

BRIEF DESCRIPTION OF THE DRAWINGS

FIG. 1 illustrates an electrochromic panel switching between a clear state and a dark state, with tinted states in between.

FIG. 9 is a table of switching time, current limit, maximum source voltage, peak power and energy to switch an electrochromic panel with a uniform transparent conducting layer (TCO), and a panel with a non-uniform gradient TCO with spatially varying sheet resistance, or with resistance to current flow substantially parallel to a major surface of the layer that varies as a function of position within the electrically conductive layer. Two different scenarios are shown for the panel with a non-uniform gradient TCO.

ABBREVIATIONS AND DEFINITIONS

Figure 1:
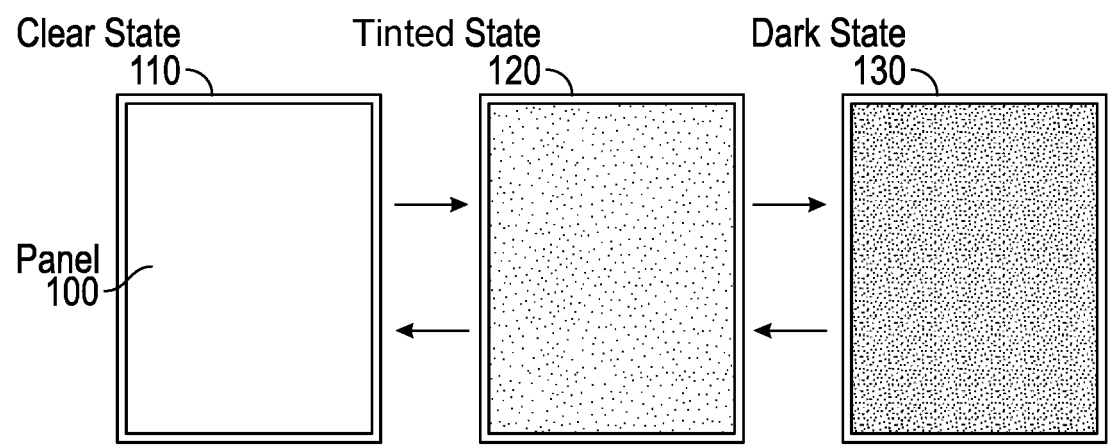

The following definitions and methods are provided to better define the present disclosure and to guide those of ordinary skill in the art in the practice of the present disclosure. Unless otherwise noted, terms are to be understood according to conventional usage by those of ordinary skill in the relevant art.

The terms "anodic electrochromic layer" and "anodic electrochromic material" refer to an electrode layer or electrode material, respectively, that upon the removal of ions and electrons becomes less transmissive to visible radiation.

The terms "cathodic electrochromic layer" and "cathodic electrochromic material" refer to an electrode layer or electrode material, respectively, that upon the insertion of ions and electrons becomes less transmissive to visible radiation.

The "CIE-Lab" color space is used herein to describe the color of the substrate or device in the bleached or colored state. In this color space, L* indicates the lightness with the darkest black at L*=0 and the brightest white at L*=100, a* indicates the red/green component of color with green at negative a* and red at positive a* values, and b* indicates the yellow/blue component of color with blue at negative b* and yellow at positive b* values. The CIE-Lab color space is also referred to as the CIE L*a*b* color space, or the CIELAB color space, which is specified by the International Commission on Illumination (or in French, Commission Internationale de L'Éclairage) hence its CIE initialism). The scaling and limits of the a* and b*axes will depend on the specific implementation of Lab color, as described below, but in this disclosure a* and b* vary over the range of ±100. The closer to zero (0) of the a* or b* values, then the more neutral the coloration.

The term "clear state" of an electrochromic device or panel refers to a state at, or very close to, the most transmissive state of the device of panel. In practice, the clear state of an electrochromic device or panel is achieved when the device or panel is switched towards the most transparent state, and the rate of change of the visible transmittance reaches a minimum. The term "dark state" of an electrochromic device or panel refers to a state at, or very close to, the least transmissive state of the device of panel. In practice, the dark state of an electrochromic device or panel is achieved when the device or panel is switched towards the least transparent state, and the rate of change of the visible transmittance reaches a minimum. The clear state and the dark state are described as the "bleached state" and the "colored state" respectively in the ASTM standard E2355-10: Standard Test Method for Measuring the Visible Light Transmission Uniformity of an Absorptive Electrochromic Coating on a Glazing Surface. Furthermore, in section 8.1 of ASTM E2355-10, there is a description for how to reach steady state in the clear state or the dark state before taking optical measurements (e.g., optical uniformity), which provides some guidelines for operating electrochromic modules. One such useful guideline is that steady state will be reached approximately 30 minutes after the change of state has been initiated, however, the document goes on to say that the time required to reach steady state "shall take into account variations in the dynamic response between samples from different manufacturers, of different technologies, and of different size." It should be noted that the particular values of visible transmission of the clear state and the dark state of an electrochromic device or panel can change over time.

The term "tinted state" (or "tint state") of an electrochromic device or panel refers to states with optical transmission between that of the clear state and dark state. In other words, the tint states are states with transmission between states at, or very close to, the most and least transmissive states of an electrochromic device or panel.

The term "color uniformity" refers to the spatially uniformity of the color of an electrochromic device or panel. An example of a measure of color uniformity is the metric deltaE.

The term "deltaE" (or "ΔE*ab", or "ΔE*", or "ΔE", or "dE*", or "dE") refers to a difference in color in the CIE L*a*b* color space, and is defined as:

$$\Delta E = \sqrt{(L_2^* - L_1^*)^2 + (a_2^* - a_1^*)^2 + (b_2^* - b_1^*)^2} \quad (1)$$

The term "electrochromic material" refers to materials that change in transmissivity to visible radiation, reversibly, as a result of the insertion or extraction of ions and electrons. For example, an electrochromic material may change between a colored, translucent state and a transparent state.

The term "electrochromic layer" refers to a layer comprising an electrochromic material.

The term "electrode layer" refers to a layer capable of conducting ions as well as electrons. The electrode layer contains a species that can be reduced when ions are inserted into the material and contains a species that can be oxidized when ions are extracted from the layer. This change in oxidation state of a species in the electrode layer is responsible for the change in optical properties in the device.

The term "gradient transparent conductive layer" refers to an electrically conducting layer with spatially varying sheet resistance, or resistance to current flow substantially parallel to a major surface of the layer, that varies as a function of position within the electrically conductive layer. Additionally, a gradient transparent conductive layer is transmissive to electromagnetic radiation having a wavelength in the range of infrared to ultraviolet.

The terms "partial switching speed" or "partial switching time" refers to the amount of time required for an electrochromic device or panel to transition from the dark state to a tinted state, or from the clear state to a tinted state, over a Tvis range that is some fraction of the full absolute percentage range from clear to dark. For example, if an electrochromic device has a clear state with a Tvis of 71% and a dark state with a Tvis of 1%, then 50% of the full absolute percentage range is 35%, and the 50% partial switching speed would be the amount of time required for the device to switch from the clear state to a tinted state of 36%, or the amount of time required for the device to switch from the dark state to a tinted state with a Tvis of 36%.

The term "perceptible" as used herein with respect to color differences, refers to color differences which can be perceived by an average human eye. For example, in some regions of the CIE-Lab color space, the average human eye cannot perceive differences in color less than about deltaE equal to 1. Similarly, the term "no perceptible color difference", refers to two colors that are close enough in color that they cannot be perceived as being different by an average human eye. The term "no perceptible color" as used herein refers to a color that is close enough in color to neutral (i.e., where a*=0 and b*=0) that the color cannot be perceived as being different than neutral by an average human eye. Quantifying sets of perceptually uniform colors is known to those skilled in the art as the set of points whose distance to the reference is less than the just-noticeable-difference (JND) threshold. In the CIE 1931 color space, for example, the tolerance contours of sets of perceptually uniform colors are bounded by MacAdam ellipses, which hold L* (lightness) fixed, and the ellipses denoting the tolerance contours vary in size. Furthermore, the sizes of the ellipses in the a* and b* plane that bound the sets of perceptually uniform colors can vary for different values of L*.

The terms "switching speed" or "switching time" refers to the amount of time required for an electrochromic device or panel to transition from the dark state to a tinted state, or from the clear state to a tinted state, over a Tvis range that is 90% of the full absolute percentage range from clear to dark. For example, if an electrochromic device has a clear state with a Tvis of 71% and a dark state with a Tvis of 1%, then 90% of the full absolute percentage range is 63%, and the switching speed would be the amount of time required for the device to switch from the clear state to a tinted state of 8%, or the amount of time required for the device to switch from the dark state to a tinted state with a Tvis of 64%.

The term "visible transmittance" refers to the fraction of light transmitted through an electrochromic film. Unless otherwise stated, the transmissivity of an electrochromic film is represented by the number $T_{vis}$. $T_{vis}$ is calculated/obtained by integrating the transmission spectrum in the wavelength range of 380-780 nm using the spectral photopic efficiency I_p(lambda) (CIE, 1924) as a weighting factor. (Ref: ASTM E1423).

DETAILED DESCRIPTION

Embodiments of the current invention describe electrochromic panels that provide improved visual characteristics and advantages in convenience and energy efficiency to users. The optimized visual characteristics include the uniform transitioning from one optical state to another across the entire panel (e.g., where all tinted states have a deltaE less than 10 across the area of the panel), a clearer clear state with no perceptible color (e.g., where the clear state has an average CIE-Lab b* from 3 to 6, an average CIE-Lab a* from −4 to 2, and an average CIE-Lab L* from 85 to 90), and a more black colored dark state (e.g., where the dark state has an average CIE-Lab b* from −5 to −2, an average CIE-Lab a* from −7 to −5, and an average CIE-Lab L* from 10 to 30). Occupants of buildings have come to expect a certain clarity of their windows so that the view is not impacted but also have come to expect the ability to shade or completely black out their windows.

In one embodiment the electrochromic glass is an electrochromic device or panel with a low transmission dark state (e.g., with Tvis less than 5%) and a high transparency clear state (e.g., with Tvis greater than 70%), and a continuum of tinted states with varying transmission between these two end states. In some embodiments, the inventive device or panel with a low transmission dark state (e.g., with Tvis less than 5%) and a high transparency clear state (e.g., with Tvis greater than 70%), and a continuum of tinted states with varying transmission between these two end states, and the dark state, the clear state and the tinted states all have colors that are close to neutral (e.g., with a* from −4 to 4, and b* from −6 to 6). This electrochromic glass may also have very fast switching speed (e.g., less than 5 minutes, or less than 10 minutes) as well as uniform transitions between states (e.g., where the clear state, dark state and all tinted states have deltaE across the area of the panel less than 10) by including one or more gradient transparent conductive layers in each electrochromic device. The inventive electrochromic glass may be used in many applications such as architectural or transportation. The architectural applications may include glass used on the exterior of the building such as windows or doors having insulated glass units (IGU's.) The architectural applications may also include interior applications such as partitions, windows, or doors.

In one embodiment the electrochromic privacy glass is an electrochromic device or panel with a low transmission dark state (e.g., with Tvis less than 0.1%) and a high transparency clear state (e.g., with Tvis greater than 55%), and a continuum of tinted states with varying transmission between the clear and dark states. In some embodiments, the inventive device or panel has a low transmission dark state (e.g., with Tvis less than 0.1%) and a high transparency clear state (e.g., with Tvis greater than 55%), and a continuum of tinted states with varying transmission between the clear and dark states, and the dark state, the clear state and the tinted states all have colors that are close to neutral (e.g., with a* from −4 to 4, and b* from −6 to 6). This electrochromic privacy glass may also have very fast switching speed (e.g., less than 5 minutes, or less than 10 minutes) as well as uniform transitions between states (e.g., where the clear state, dark state and all tinted states have deltaE across the area of the panel less than 10) by including one or more gradient transparent conductive layers in each electrochromic device. The inventive electrochromic privacy glass may be used in many applications such as architectural or transportation. The architectural applications may include glass used on the exterior of the building such as windows or doors having insulated glass units (IGU's.) The architectural applications may also include interior applications such as partitions, windows, or doors.

Electrochromic panels described herein can contain one electrochromic device, or more than one electrochromic device. In some embodiments, electrochromic panels described herein contain more than one electrochromic device arranged such that incident light passes through both devices. An example is a panel with two electrochromic devices laminated together, which has a very low Tvis in the dark state because the absorption of both devices is compounded. In some embodiments, the electrochromic devices and panels are formed within an insulated glass unit (IGU). In some embodiments, more than one electrochromic device is integrated into a single electrochromic panel and electrically connected in series or in parallel.

FIG. 1 shows an electrochromic panel 100 having a clear state 110, a tinted state 120, and a dark state 130. The clear state 110 is the most transparent state of the electrochromic panel. In some embodiments, the electrochromic device having the structure and chemistries described herein has a clarity and transparency in the clear state that is neutral and has no visually perceptible coloration. This is quantified using the CIE-L*a*b* (or CIE-Lab) color space characteristics and visible transmittance. The Lab color space is a color-opponent space with dimension L* for lightness and a* and b* for the color opponent dimensions. In practice, the space is usually mapped onto a three-dimensional integer space and for these reasons, the L*, a*, and b* values are usually absolute, with a pre-defined range. The lightness, L*, represents the darkest black at L*=0, and the brightest white at L*=100. The color channels, a* and b*, will represent true neutral gray values at a*=0 and b*=0. The red/green opponent colors are represented along the a* axis, with green at negative a* values and red at positive a* values. The yellow/blue opponent colors are represented along the b* axis, with blue at negative b* values and yellow at positive b* values. The electrochromic panels described herein have a*, and b* values that are close to zero and provide neutral coloration to a viewer in the dark state, the clear state, and any tinted state in between.

In some embodiments, the electrochromic panels described herein have a clear state CIE-Lab b* in transmission from −10 to 10, or from −8 to 8, or from −6 to 6, or from −5 to 5, or from 0 to 10, or from 2 to 8, or from 3 to 6, or from 4 to 5, or approximately 5, or approximately 4.5, or approximately 4, or approximately 2, or approximately −5, or approximately −4, or approximately −2, or approximately 0. In some embodiments, the electrochromic panels described herein have a clear state CIE-Lab a* in transmission from −10 to 10, or from −8 to 8, or from −5 to 5, or from −4 to 4, or from −4 to 2, or from −2 to 4, or from −2 to 2, or from −1 to 1, or approximately −1, or approximately −0.5, or approximately 0, or approximately 0.5, or approximately 1. In some embodiments, the electrochromic panels described herein have a clear state CIE-Lab L* in transmission from 80 to 100, or from 85 to 100, or from 85 to 95, or from 85 to 90, or from 70 to 95, or approximately 90, or approximately 87.5, or approximately 85.

In some embodiments, the electrochromic panels described herein have a clear state CIE-Lab b* in transmission from −10 to 10, or from −8 to 8, or from −6 to 6, or from −5 to 5, or from 0 to 10, or from 2 to 8, or from 3 to 6, or from 4 to 5, or approximately 5, or approximately 4.5, or approximately 4, or approximately 2, or approximately −5, or approximately −4, or approximately −2, or approximately 0; and CIE-Lab a* in transmission from −10 to 10, or from −8 to 8, or from −5 to 5, or from −4 to 4, or from −4 to 2, or from −2 to 4, or from −2 to 2, or from −1 to 1, or approximately −1, or approximately −0.5, or approximately 0, or approximately 0.5, or approximately 1; and a CIE-Lab L* in transmission from 80 to 100, or from 85 to 100, or from 85 to 95, or from 85 to 90, or from 70 to 95, or approximately 90, or approximately 87.5, or approximately 85.

In some embodiments, the electrochromic panels described herein have a clear state Tvis greater than 50%, or greater than 55%, or greater than 60%, or greater than 65%, or greater than 70%, or greater than 75%, or greater than 80%, or greater than 85%, or greater than 90%, or greater than 95%, or from 60% to 99%, or from 60% to 95%, or from 60% to 90%, or from 70% to 90%, or from 70% to 85%, or from 70% to 80%.

In some embodiments, the electrochromic panels described herein have a clear state color uniformity (deltaE) in transmission less than 15, or less than 10, or less than 8, or less than 5, or from 0 to 15, or from 0 to 10, or from 0 to 5.

In some embodiments, the electrochromic panels described herein have a dark state CIE-Lab b* in transmission from −10 to 10, or from −8 to 8, or from −6 to 6, or from −5 to 5, or from 0 to 10, or from 2 to 8, or from 3 to 6, or from 4 to 5, or from −10 to 0, or from −8 to 0, or from −6 to −1, or from −5 to −2, or approximately −4, or approximately −3.5, or approximately −3, or approximately 5, or approximately 4.5, or approximately 4, or approximately 2, or approximately −5, or approximately −2, or approximately 0. In some embodiments, the electrochromic panels described herein have a dark state CIE-Lab a* in transmission from −10 to 0, or from −8 to 2, or from −8 to 4, or from −8 to 8, or from −7 to −5, or from −6.5 to −5.5, or approximately −6.5, or approximately −6, or approximately −5.5. In some embodiments, the electrochromic panels described herein have a dark state CIE-Lab L* in transmission from 0 to 40, or from 0 to 30, or from 0 to 20, or from 10 to 30, or from 15 to 25, or approximately 10, or approximately 15, or approximately 20.

In some embodiments, the electrochromic panels described herein have a dark state CIE-Lab b* in transmission from −10 to 10, or from −8 to 8, or from −6 to 6, or from −5 to 5, or from 0 to 10, or from 2 to 8, or from 3 to 6, or from 4 to 5, or from −10 to 0, or from −8 to 0, or from −6 to −1, or from −5 to −2, or approximately −4, or approximately −3.5, or approximately −3, or approximately 5, or approximately 4.5, or approximately 4, or approximately 2, or approximately −5, or approximately −2, or approximately 0; and a CIE-Lab a* in transmission from −10 to 0, or from −8 to 2, or from −8 to 4, or from −8 to 8, or from −7 to −5, or from −6.5 to −5.5, or approximately −6.5, or approximately −6, or approximately −5.5; and a CIE-Lab L* in transmission from 0 to 40, or from 0 to 30, or from 0 to 20, or from 10 to 30, or from 15 to 25, or approximately 10, or approximately 15, or approximately 20.

In some embodiments, the electrochromic panels described herein have a dark state Tvis less than 35%, or less than 30%, or less that 25%, or less than 20%, or less than 15%, or less than 10%, or less than 5%, or less than 4%, or less than 3%, or less than 2%, or less than 1%, or less than 0.1%, or less than 0.01%, or less than 0.001%, or from 0.001% to 20%, or from 0.001% to 15%, or from 0.001% to 10%, or from 0.001% to 5%, or from 0.01% to 5%, or from 0.1% to 5%.

In some embodiments, the electrochromic panels described herein have a dark state color uniformity (deltaE) in transmission less than 15, or less than 10, or less than 8, or less than 5, or from 0 to 15, or from 0 to 10, or from 0 to 5.

In some embodiments, the electrochromic panels described herein have a tinted state CIE-Lab b* in transmission from 0 to 10, or from 2 to 8, or from 3 to 6, or from 4 to 5, or from −10 to 0, or from −8 to 0, or from −6 to −1, or from −5 to −2, or from −10 to 10, or from −8 to 8, or from −6 to 6, or from −4 to 4, or from −2 to 2, or approximately 5, or approximately 4.5, or approximately 4, or approximately 2, or approximately 0, or approximately −2, or approximately −4, or approximately −3.5, or approximately −3. In some embodiments, the electrochromic panels described herein have a tinted state CIE-Lab a* in transmission from −10 to 10, or from −8 to 8, or from −5 to 5, or from −4 to 4, or from −4 to 2, or from −2 to 4, or from −2 to 2, or from −1 to 1, or from −10 to 0, or from −8 to 2, or from −8 to 4, or from −7 to −5, or from −6.5 to −5.5, or approximately −6.5, or approximately −6, or approximately −5.5, or approximately −4, or approximately −2, or approximately 2, or approximately 4, or approximately −1, or approximately −0.5, or approximately 0, or approximately 0.5, or approximately 1. In some embodiments, the electrochromic panels described herein have a tinted state CIE-Lab L* in transmission from 0 to 90, or from 20 to 90, or from 40 to 90, or from 60 to 90, or approximately 90, or approximately 87.5, or approximately 85, or from 80 to 100, or from 85 to 100, or from 85 to 95, or from 85 to 90, or approximately 90, or approximately 87.5, or approximately 85, or from 0 to 40, or from 0 to 30, or from 0 to 20, or from 10 to 30, or from 15 to 25, or approximately 90, or approximately 87.5, or approximately 85, or approximately 70, or approximately 60, or approximately 50, or approximately 40, or approximately 30, or approximately 20, or approximately 10, or approximately 15.

In some embodiments, the electrochromic panels described herein have a tinted state CIE-Lab b* in transmission from 0 to 10, or from 2 to 8, or from 3 to 6, or from 4 to 5, or from −10 to 0, or from −8 to 0, or from −6 to −1, or from −5 to −2, or from −10 to 10, or from −8 to 8, or from −6 to 6, or from −4 to 4, or from −2 to 2, or approximately 5, or approximately 4.5, or approximately 4, or approximately 2, or approximately 0, or approximately −2, or approximately −4, or approximately −3.5, or approximately −3; and −Lab a* in transmission from −10 to 10, or from −8 to 8, or from −5 to 5, or from −4 to 4, or from −4 to 2, or from −2 to 4, or from −2 to 2, or from −1 to 1, or from −10 to 0, or from −8 to 2, or from −8 to 4, or from −7 to −5, or from −6.5 to −5.5, or approximately −6.5, or approximately −6, or approximately −5.5, or approximately −4, or approximately −2, or approximately 2, or approximately 4, or approximately −1, or approximately −0.5, or approximately 0, or approximately 0.5, or approximately 1; and a CIE-Lab L* in transmission from 0 to 90, or from 20 to 90, or from 40 to 90, or from 60 to 90, or approximately 90, or approximately 87.5, or approximately 85, or from 80 to 100, or from 85 to 100, or from 85 to 95, or from 85 to 90, or approximately 90, or approximately 87.5, or approximately 85, or from 0 to 40, or from 0 to 30, or from 0 to 20, or from 10 to 30, or from 15 to 25, or approximately 90, or approximately 87.5, or approximately 85, or approximately 70, or approximately 60, or approximately 50, or approximately 40, or approximately 30, or approximately 20, or approximately 10, or approximately 15.

In some embodiments, the electrochromic panels described herein have a tinted state Tvis greater than 50%, or greater than 55%, or greater than 60%, or greater than 65%, or greater than 70%, or greater than 75%, or greater than 80%, or greater than 85%, or greater than 90%, or greater than 95%%, or less than 20%, or less than 15%, or less than 10%, or less than 5%, or less than 4%, or less than 3%, or less than 2%, or less than 1%, or less than 0.1%, or less than 0.01%, or less than 0.001%, or from 0.001% to 99%, or from 0.01% to 99%, or from 0.1% to 99%, or from 10% to 90%, or from 10% to 80%, or from 10% to 70%, or from 20% to 70%, or from 50% to 70%, or from 20% to 50%, or from 40% to 60%, or from 20% to 40%, or from 60% to 70%.

In some embodiments, the electrochromic panels described herein have a tinted state color uniformity (deltaE) in transmission less than 15, or less than 10, or less than 8, or less than 5, or from 0 to 15, or from 0 to 10, or from 0 to 5.

In some embodiments, the electrochromic device or panel incorporates one or more substrates, and the substrates contribute to the overall Tvis and color of the device or panel in transmission. For example, glass substrates typically have high transmission and a* in transmission and b* in transmission close to zero, but L*, a* and b* for glass are typically not equal 0. The Tvis values, CIE-Lab L*, a* and b* values in transmission described for electrochromic devices and panels herein refer to the Tvis or color of the entire device in transmission including the substrate, unless otherwise noted.

Figure 2A:
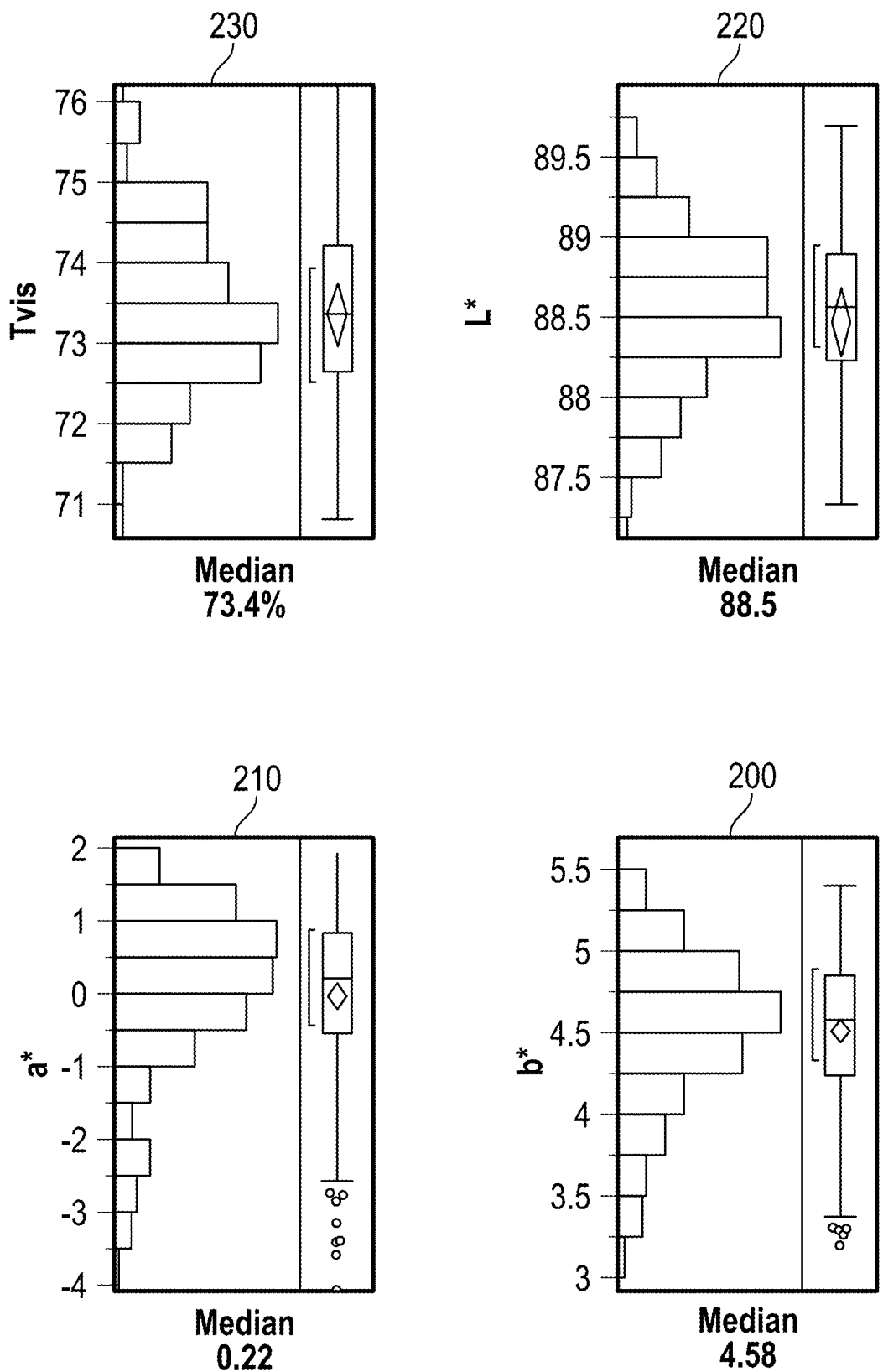
FIG. 2A is a set of histograms of optical properties of electrochromic panels in the clear state.

FIG. 2A shows transmission data that was collected on single electrochromic panels having chemistries as described herein. The clear state 110 had a b* value 200 from approximately +3 to approximately +6, and a median b* of approximately 4.5 for the electrochromic panels. A panel with a CIE-Lab b* close to 4.5 does not have a perceptible yellow color, which is valuable to windows in their clear states because it is unattractive to the viewer to see any color that would affect the view seen through the window. The a* value 210 as experimentally shown in FIG. 2A were very neutral and had a range of approximately −2 to +2, and had a median of around zero. This means that there was no perceptible green or red color in the electrochromic panel. FIG. 2A also shows experimental data for L* and for Tvis. The L* value 220 relates to brightness and in the clear state 110 had a value in the range of approximately 87 to 90. A high L* means that any color is less perceptible and that the light transmissivity is high with very low color absorption. The Tvis data 230 for these panels show that the visible transmittance values were above 70% and approached 80%. Additionally the electrochromic panel had less than 1% haze. In practical effect this means that any haze was imperceptible to the human eye.

Figure 2B:
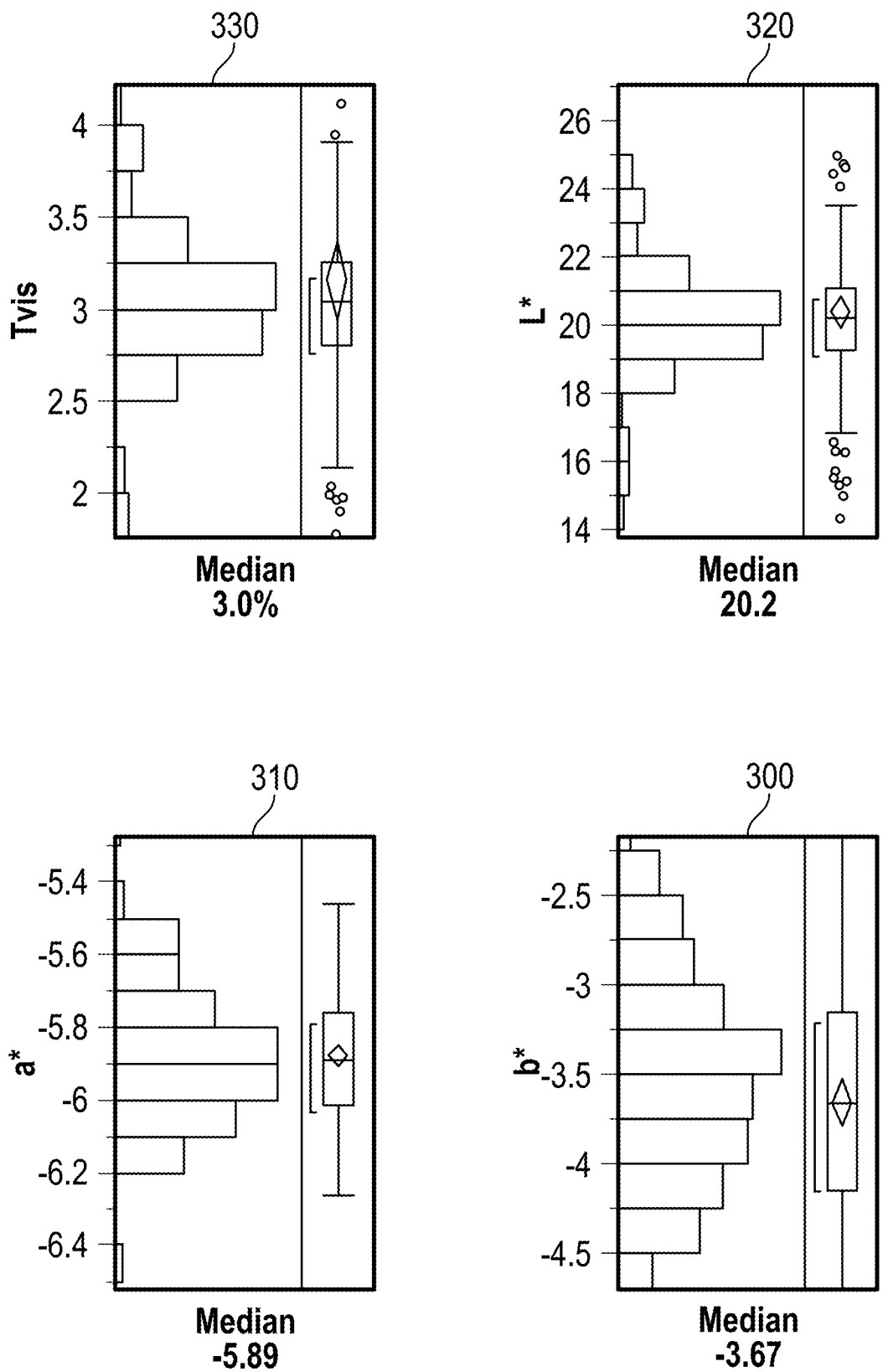
FIG. 2B is a set of histograms of optical properties of electrochromic panels in the dark state.

FIG. 2B shows transmission data collected on single electrochromic panels having chemistries as described herein. The dark state 130 had a b* value of in the range of approximately −5 to −2, and a median of approximately 3.5. This means that there was no blue color perceptible to the human eye and that the dark state 130 was very neutral in the yellow/blue b* color space. The dark state 130 had an a* in the approximate range of −6 to −5 which is close enough to zero to be color neutral to the human eye. L* 320 was in the approximate range of 14 to 25 and had a median of approximately 20. The L* contributes to the true black color present in the electrochromic panels described herein. The visible transmittance of light, the Tvis 330, for a single panel electrochromic device in the dark state was 4% or less, and more approximately 3.5% or less.

In some embodiments, the tint states 120 between the dark state 130 and the clear state 110 have b* values in transmission in the approximate range of −8 to +6, or in the approximate range of −4 to +5; and have an a* value in transmission in the approximate range of −3 and +2; and have a visible transmittance to light in the approximate range of 2.5% to 80%. In some embodiments, electrochromic panels with two electrochromic devices have a Tvis in the approximate range of 0.01% and 60%, or from 0.01% to 50%, or from 0.01% to 40%. In some embodiments the tint states as well as the clear state and the dark state also have a color uniformity of ΔE*ab (or, deltaE) in transmission of less than 2.

Figure 3:
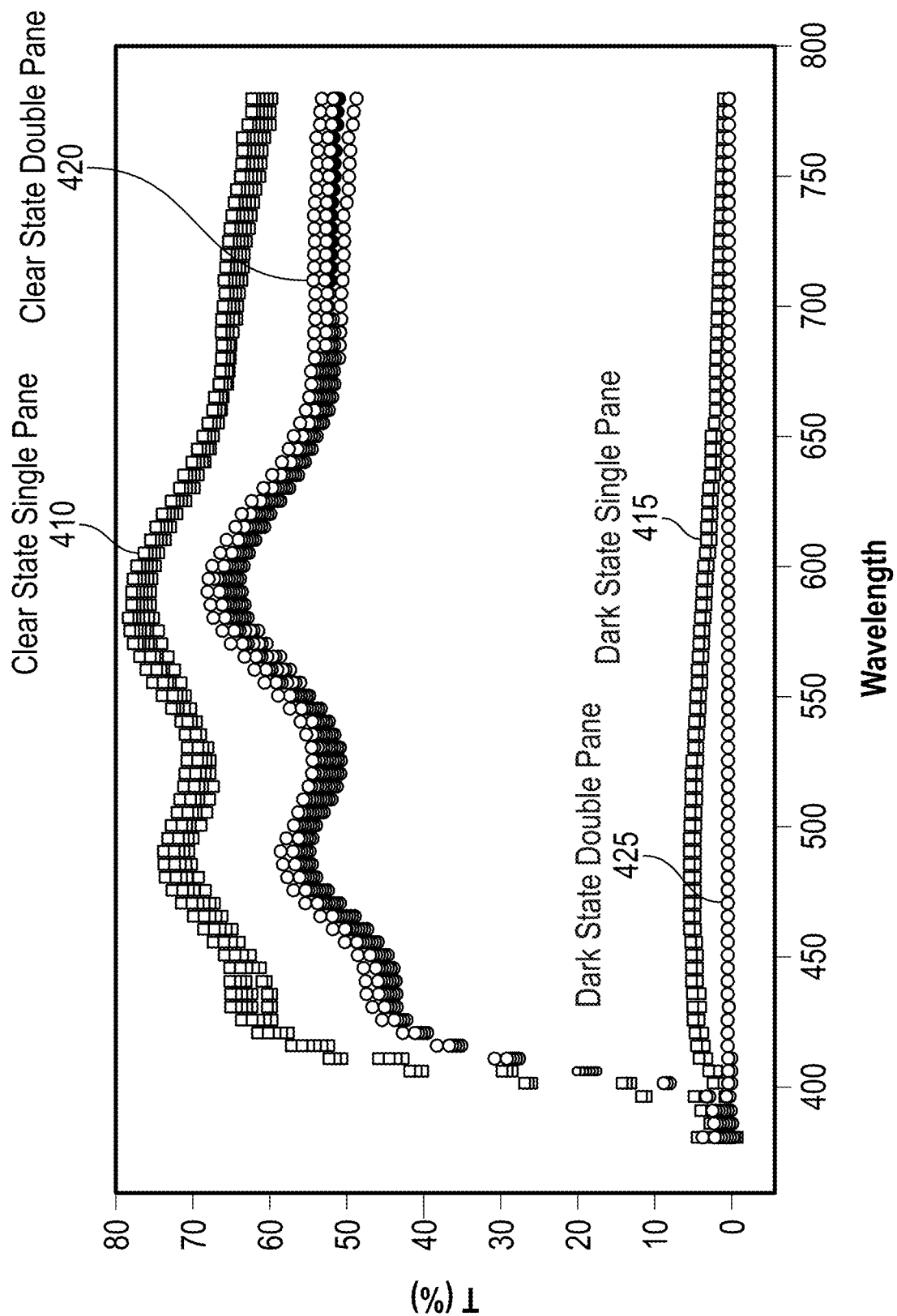
FIG. 3 is a graph with transmission spectra of single pane and double pane electrochromic devices in the clear and dark states.

FIG. 3 is a graph of visible transmittance of light (T % or Tvis) on the y-axis vs. the wavelength of the light on the x-axis showing the visible transmittance of the clear states and the dark states for electrochromic panels with one electrochromic device (i.e., single pane devices) and electrochromic panels with two electrochromic devices (i.e., double pane devices). The dimensions of the devices in this example are approximately 80×130 cm². This figure provides a relative comparison of the single pane and double pane devices, showing that the Tvis of the clear states and dark states are lower for the double pane devices than for the single pane devices. The visible transmittance of light for the clear state 410 of the single pane electrochromic device as compared to the clear state 415 of the double pane device shows that there may be different applications for each depending on the needs of the usage, for example using the panel for an exterior window or using the panel for an interior partition. The dark state 415 of the single panel device provides a dark shaded window and the dark state of the double pane device provides a very dark window that can meet privacy glass standards. The single pane device disclosed herein may have a clear state having a Tvis or T550 of 60% or greater, or 70% or greater, or 75% or greater. The double pane device disclosed herein may have a clear state having a Tvis or T550 of 40% or greater, or 50% or greater, or 60% or greater. In the dark state the single pane device as disclosed herein may have a Tvis or T550 of 10% or less, or, 5% or less, or 3% or less, or 1% or less. The double pane device as disclosed herein may have a dark state having a Tvis or T550 of 1% or less, or 0.1% or less, or 0.01% or less. The electrochromic panels with two electrochromic devices described herein may have applicability to uses requiring greater privacy or "black-out" conditions, for example as interior partitions in homes, offices, hospitals, museums, or retail. The ability to block the visibility through interior partitions is valuable for open lay-out office spaces where the creation of walls on demand to section off portions of the office or to provide privacy in individual offices or conference rooms is valuable.

In some embodiments, the electrochromic panels described herein have a dark state CIE-Lab b* in reflection from −10 to 10, or from −8 to 8, or from −6 to 6, or from −5 to 5, or from 0 to 10, or from 2 to 8, or from 3 to 6, or from 4 to 5, or from −10 to 0, or from −8 to 0, or from −6 to −1, or from −5 to −2, or approximately −4, or approximately −3.5, or approximately −3, or approximately 5, or approximately 4.5, or approximately 4, or approximately 2, or approximately −5, or approximately −2, or approximately 0. In some embodiments, the electrochromic panels described herein have a dark state CIE-Lab a* in reflection from −10 to 0, or from −8 to 2, or from −8 to 4, or from −8 to 8, or from −7 to −5, or from −6.5 to −5.5, or approximately −6.5, or approximately −6, or approximately −5.5.

In some embodiments, the electrochromic panels described herein have a dark state CIE-Lab b* in reflection from −10 to 10, or from −8 to 8, or from −6 to 6, or from −5 to 5, or from 0 to 10, or from 2 to 8, or from 3 to 6, or from 4 to 5, or from −10 to 0, or from −8 to 0, or from −6 to −1, or from −5 to −2, or approximately −4, or approximately −3.5, or approximately −3, or approximately 5, or approximately 4.5, or approximately 4, or approximately 2, or approximately −5, or approximately −2, or approximately 0; and a CIE-Lab a* in reflection from −10 to 0, or −10 to −6, or −10 to −7, or −8 to −6, or −4 to −2, or −9 to −8, or from −8 to 2, or from −8 to 4, or from −8 to 8, or from −7 to −5, or from −6.5 to −5.5, or approximately −6.5, or approximately −6, or approximately −5.5.

Figure 4:
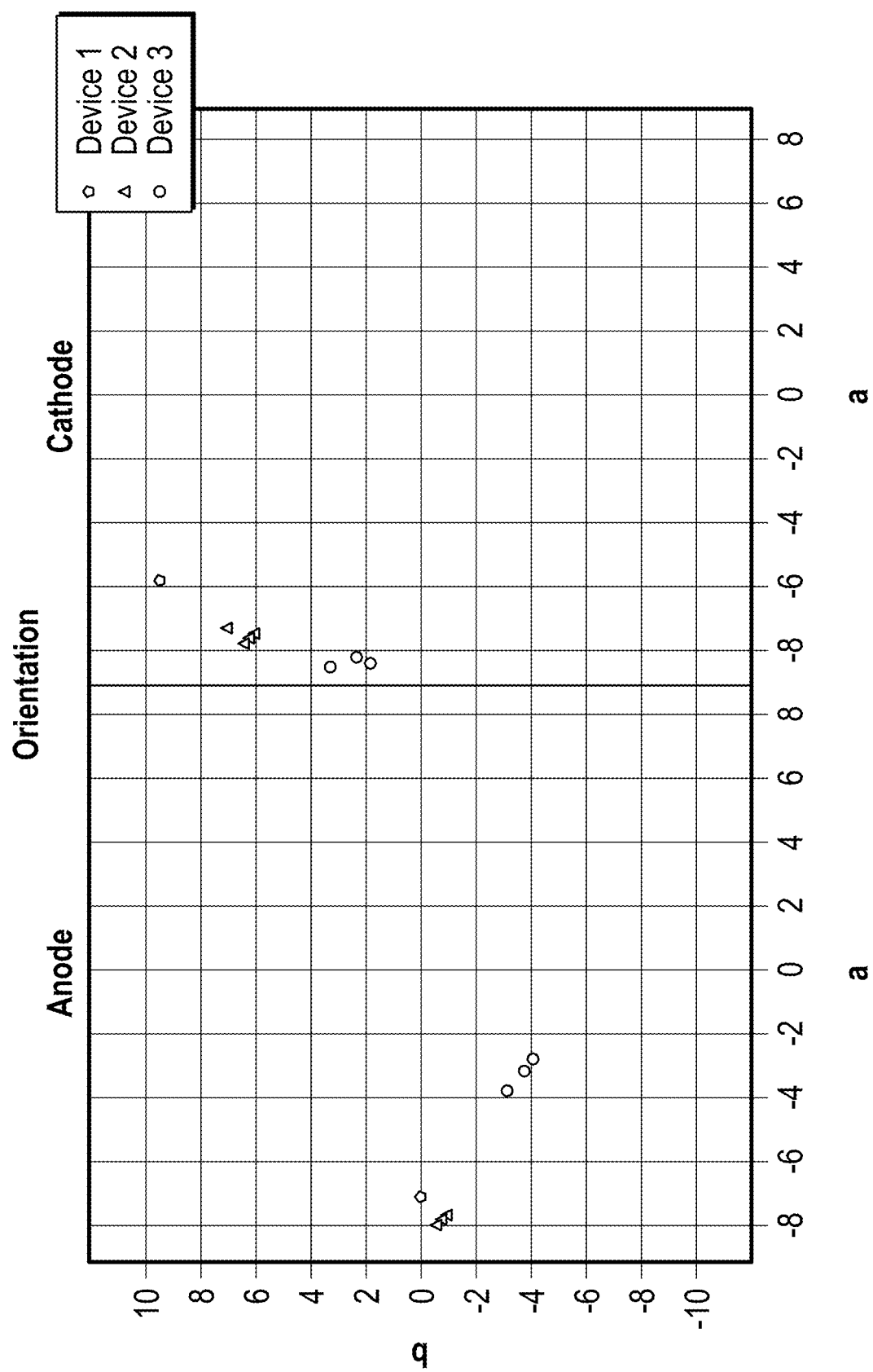
FIG. 4 is a plot with CIE-Lab a* and b* values for electrochromic panels in the dark state oriented with the anode or the cathode facing the illumination source.

FIG. 4 is a graph of the a* and b* of the light reflected from electrochromic devices in the dark state in different orientations. The electrochromic devices (Device 1, Device 2 and Device 3) in these examples have an electrochromic anode layer, an electrochromic cathode layer, and an ion conductor layer between the electrochromic anode and cathode layers, and these layers are sandwiched between two outer glass substrates. The device oriented with the electrochromic anode layer closer to the incident light direction than the electrochromic cathode layer (i.e., labeled in the figure as "anode" orientation) have a* in reflection from approximately −8 to −2, and b* in reflection from approximately −4 to 0. The device oriented with the electrochromic cathode layer closer to the incident light direction than the electrochromic anode layer (i.e., labeled in the figure as "cathode" orientation) have a* in reflection from approximately −9 to −6, and b* in reflection from approximately 2 to 10. Therefore, the "cathode" oriented device has a more green appearance in reflection, and the "anode" oriented device has a more blue appearance in reflection.

There are a number of factors that influence the transmitted and reflected light in the electrochromic panels described herein, in different embodiments. In some embodiments, the thickness of the anode and cathode layers will affect the Tvis, and the CIE-Lab L*, a*, and b* in transmission and reflection. In some embodiments, the thickness and optical properties of the transparent conductor layers will affect the Tvis, and the CIE-Lab L*, a*, and b* in transmission and reflection.

In some embodiments, the electrochromic panels described herein contain layers and/or coatings that are intended to alter the spectrum of the transmission and/or reflection and will therefore affect the Tvis, and the CIE-Lab L*, a*, and b* in transmission and reflection. Some examples of layers or coatings that can be contained within the electrochromic panels described herein are low-E coatings and anti-reflection coatings.

Figure 5:
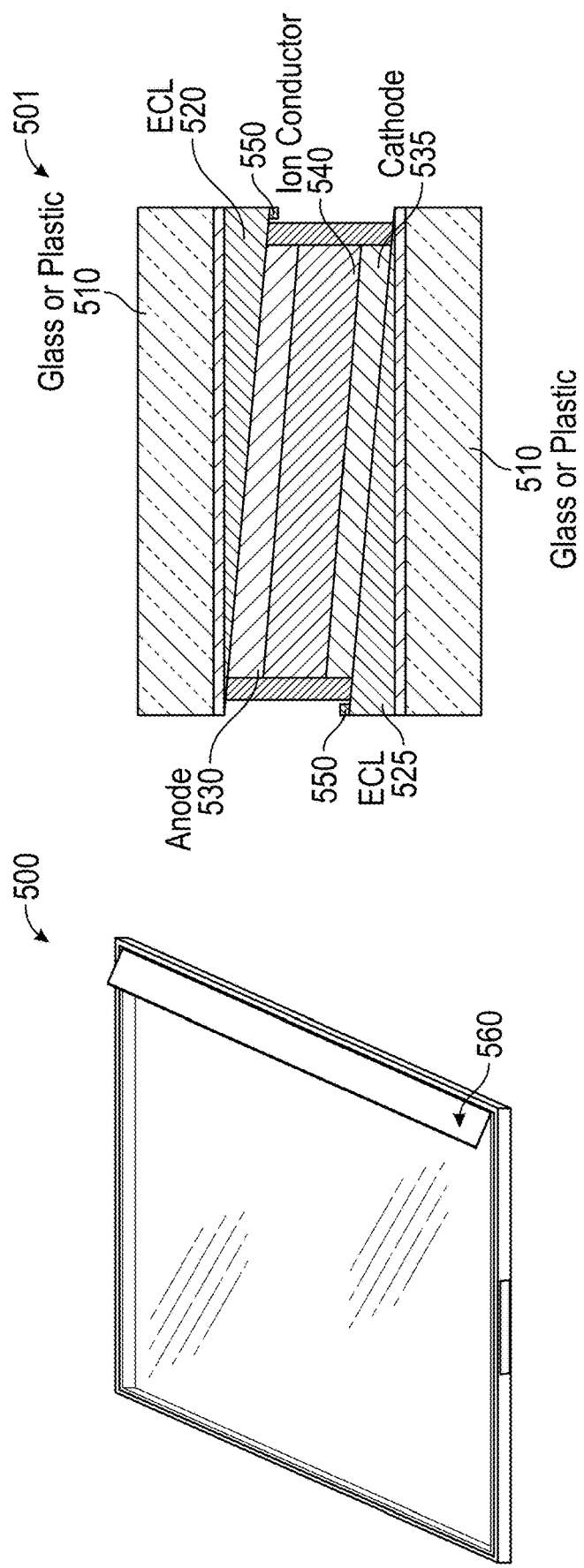
FIG. 5 shows schematics of electrochromic panels from the top down and in cross-section, showing a panel with a sequestration portion, and a panel with electrically conducting layers with spatially varying sheet resistance, or electrically conducting layers with resistance to current flow substantially parallel to a major surface of the layer that varies as a function of position within the electrically conductive layer.
Figure 6:
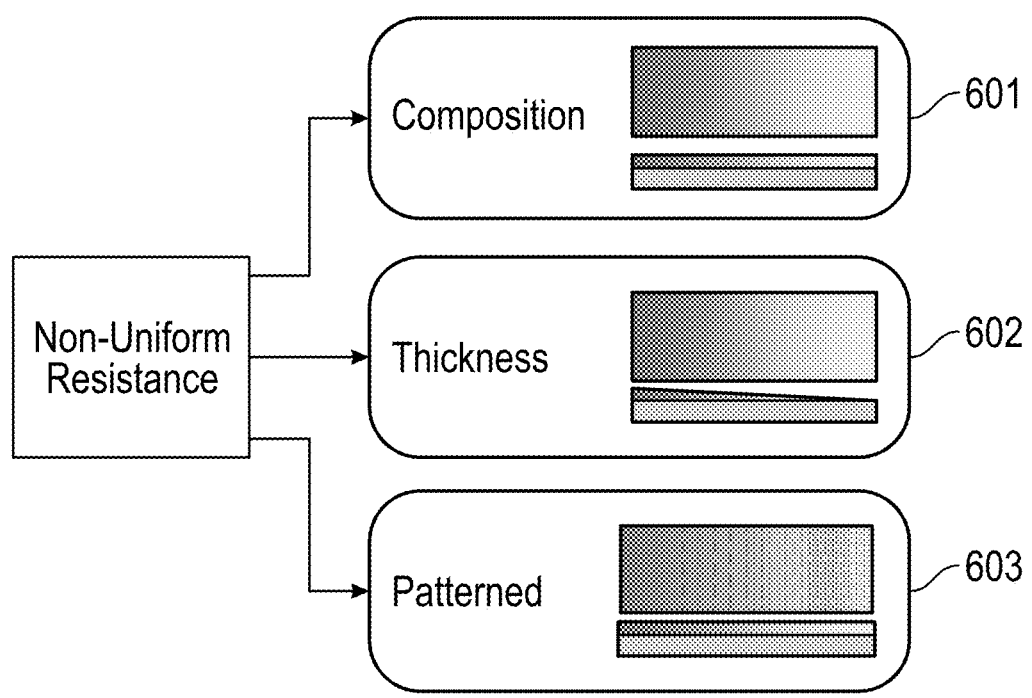
FIG. 6 shows schematics of three different embodiments of electrically conductive layers from the top down and in cross-section with spatially varying sheet resistance, or with resistance to current flow substantially parallel to a major surface of the layer that varies as a function of position within the electrically conductive layer, including electrically conductive layers with varying composition, varying thickness, and varying patterns.

FIG. 5 illustrates an electrochromic panel 500 having a cross-section 501, in some embodiments. The panel is a "sandwich" of the electrochromic device materials between two substrates 510. The substrates may be either glass or plastic or any other transparent material. Each of the substrates 510 has electrically conducting layers (ECLs) 520 and 525. The electrically conducting layers are formed of a transparent conductive layer, such as a transparent conductive oxide (common materials include indium titanium oxide and tantalum tin oxide) though may be any material meeting the requirements of being transparent and electrically conductive. In some embodiments, one or both of the electrically conducting layers are gradient electrically conductive layers. A gradient electrically conductive layer, as defined herein, refers to an electrically conducting layer with spatially varying sheet resistance, or resistance to current flow substantially parallel to a major surface of the layer, that varies as a function of position within the electrically conductive layer. In the embodiments depicted in 501 the electrically conducting layers are a gradient based on thickness of the transparent conductive oxide material and have an inverse symmetry. The electrically conducting layer 520 is thinnest on the left side and becomes thicker as it moves towards the right side. The electrically conducting layer 525 has the inverse symmetry and is thicker on the left side and becomes thinner as it moves towards the right side. In other embodiments, as illustrated by the top down and side view schematics in FIG. 6, the resistance gradient in the transparent conductive layer may be formed by different techniques such as by creating a gradient in the composition of the transparent conductive layer as shown in 601 or by patterning the materials with a scribe or etchant as shown in 603 to effectively create an "electron maze." Regardless of the technique used the gradients may have an inverse symmetry to one another. The gradient transparent conductive layer allows for the use of electrochromic devices in panels used for large scale applications such as architectural windows or in transportation applications such as buses and trains or automobiles. This is because with a gradient transparent conductive layer there is not a drop in effective voltage across the electrochromic panel 500 once the voltage is applied to the electrochromic device at the bus bars 550 which provides for a uniform transition between tint states across all dimensions of the electrochromic panel. More details on gradient transparent conductive layers and different embodiments applicable to the electrochromic devices described in this specification can be found in U.S. Pat. No. 8,717,658 entitled Electrochromic Multi-Layer Devices With Spatially Coordinated Switching (incorporated herein by reference), U.S. Pat. No. 9,091,895 Electrochromic Multi-Layer Devices With Composite Electrically Conductive Layers (incorporated herein by reference), U.S. Pat. No. 9,091,868 Electrochromic Multi-Layer Devices With Composite Current Modulating Structure (incorporated herein by reference), and patent application number US 2014/0043668 Electrochromic Multi-Layer Devices With Current Modulating Structure (incorporated herein by reference.) The gradient transparent conductive layers 520 and 525 not only remove the "iris effect" problem that larger scale electrochromic devices have by enabling the uniform transition between states across the entire surface of the electrochromic panel, but enables the fast transition between tint states (i.e., a short switching time, or a fast switching speed) and in particular from the clear state to the dark state and vice versa.

In some embodiments, the electrochromic devices or panels described herein have a "switching speed" less than 10 min, or less than 8 min, or less than 6 min, or less than 5 min, or less than 4 min, or less than 3 min, or less than 2 min, or less than 1 min, or from 1 min to 10 min, or from 1 min to 8 min, or from 1 min to 6 min, or from 1 min to 5 min, or from 1 min to 4 min, or from 1 min to 2 min. In some embodiments, the electrochromic devices or panels described herein have a total area of greater than $0.1\ m^2$, or greater than $0.25\ m^2$, or greater than $0.5\ m^2$, or greater than $0.75\ m^2$, or greater than $1.0\ m^2$, or greater than $1.5\ m^2$, or greater than $2\ m^2$, or from $0.1\ m^2$ to $3\ m^2$, or from $0.1\ m^2$ to $2\ m^2$, or from $0.1\ m^2$ to $1.5\ m^2$, or from $0.5\ m^2$ to $3\ m^2$, or from $0.5\ m^2$ to $2\ m^2$, or from $0.5\ m^2$ to $1.5\ m^2$, and have a "switching speed" less than 10 min, or less than 8 min, or less than 6 min, or less than 5 min, or less than 4 min, or less than 3 min, or from 1 min to 10 min, or from 1 min to 8 min, or from 1 min to 6 min, or from 1 min to 5 min, or from 1 min to 4 min, or from 1 min to 2 min.

In some embodiments, the electrochromic devices or panels described herein have a 50% "partial switching speed" (i.e., the amount of time required for an electrochromic device or panel to transition from the dark state to a tinted state, or from the clear state to a tinted state, over 50% of the Tvis range) less than 5 min, or less than 4 min, or less than 3 min, or less than 2.5 min, or less than 2 min, or less than 1.5 min, or from 0.5 min to 5 min, or from 0.5 min to 4 min, or from 0.5 min to 3 min, or from 0.5 min to 2.5 min, or from 0.5 min to 2 min, or from 0.5 min to 1 min. In some embodiments, the electrochromic devices or panels described herein have a total area of greater than $0.1\ m^2$, or greater than $0.25\ m^2$, or greater than $0.5\ m^2$, or greater than $0.75\ m^2$, or greater than $1.0\ m^2$, or greater than $1.5\ m^2$, or greater than $2\ m^2$, or from $0.1\ m^2$ to $3\ m^2$, or from $0.1\ m^2$ to $2\ m^2$, or from $0.1\ m^2$ to $1.5\ m^2$, or from $0.5\ m^2$ to $3\ m^2$, or from $0.5\ m^2$ to $2\ m^2$, or from $0.5\ m^2$ to $1.5\ m^2$, and have a 50% "partial switching speed" less than 5 min, or less than 4 min, or less than 3 min, or less than 2.5 min, or less than 2 min, or less than 1.5 min, or from 0.5 min to 5 min, or from 0.5 min to 4 min, or from 0.5 min to 3 min, or from 0.5 min to 2.5 min, or from 0.5 min to 2 min, or from 0.5 min to 1 min.

Figure 7A:
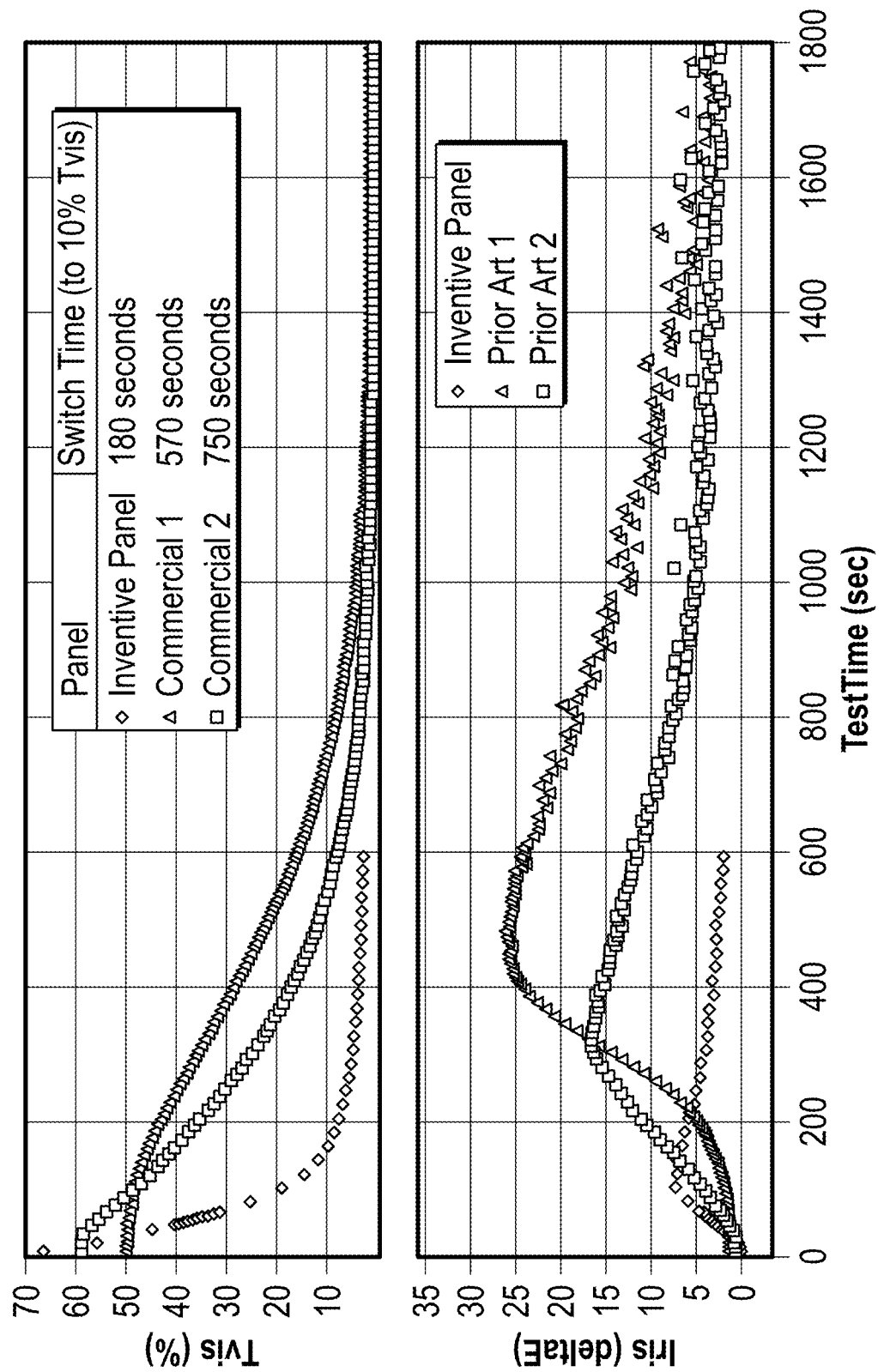
FIG. 7A is plots of optical properties of electrochromic panels during switching from a clear state to a dark state, including plots of Tvis over time and the iris measured using deltaE over time, including an electrochromic panel described herein, and two commercially available electrochromic panels.

FIG. 7A shows graphs illustrating the uniform and fast switching (i.e., short switching time, or fast switching speed) of the electrochromic panels described herein (i.e., "Inventive Panel" in FIG. 7A). The two graphs are along the same time axis (the x-axis) in seconds. The top graph shows the Tvis (%) of the Inventive Panel compared to Prior Art panels 1 and 2. The Inventive Panel has dimensions of approximately $80\times130\ cm^2$. The "Commercial 1" and "Commercial 2" panels shown in FIG. 7A are commercially available electrochromic panels with areas approximately 3'×5'. The switching speed (i.e., switching time) of the Inventive Panel is significantly faster because it has a gradient transparent conductive layer. The bottom graph shows the Iris (deltaE) which is measured between two coordinates on the panel, one point from the edge and one point from the center is measured using spectrometers to obtain the delta E. The Inventive Panel has a delta E of less than 8 as compared to prior art electrochromic panel 1 which has a delta E of around 25 and as compared to prior art electrochromic panel 2 which has a delta E of around 16. The iris effects of the prior art panels 1 and 2 are very noticeable whereas the delta E of the Inventive panel is hardly noticeable.

Figure 7B:
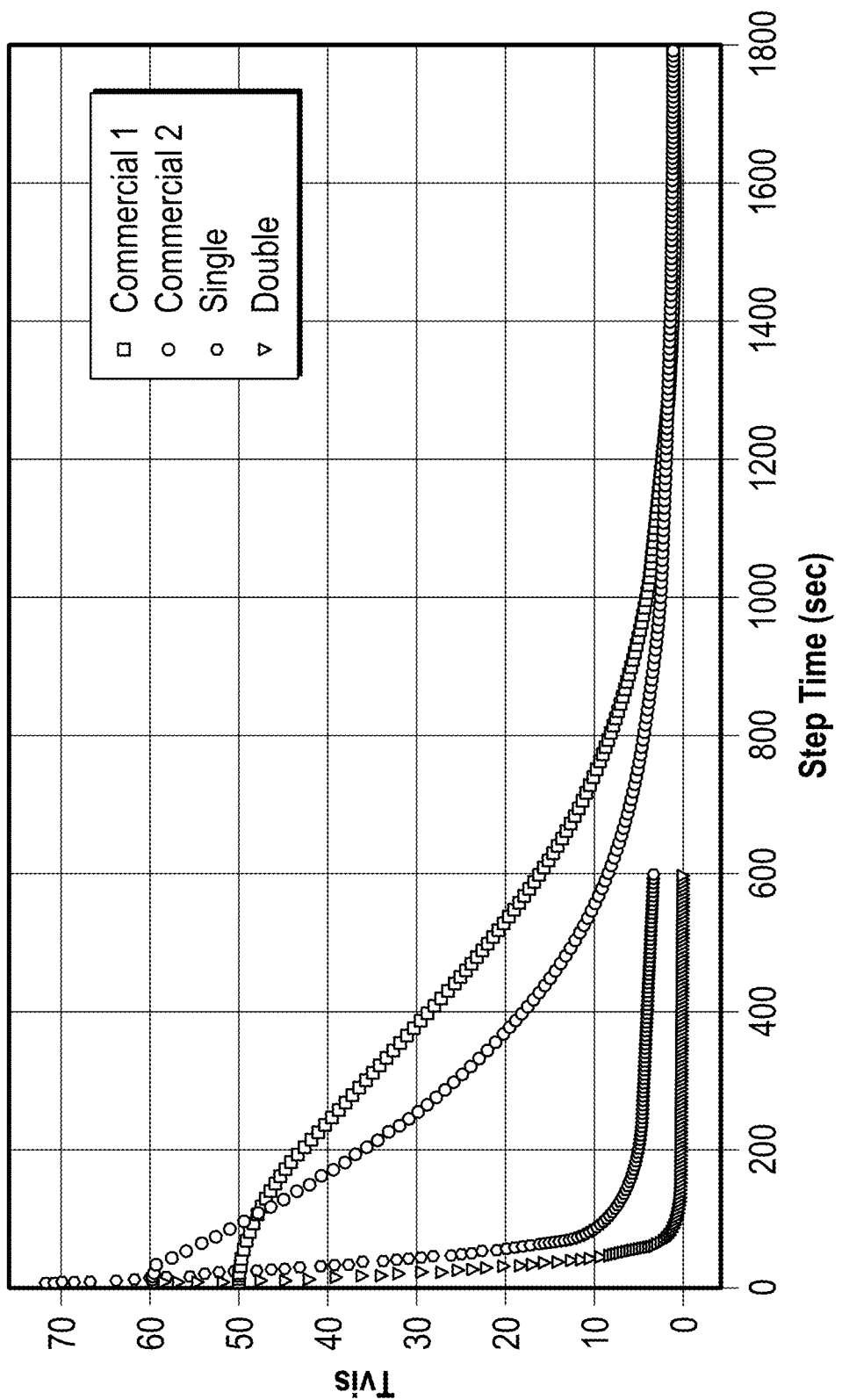
FIG. 7B is a plot of Tvis over time for electrochromic panels during switching from a clear state to a dark state, including a single pane electrochromic panel described herein, a double pane electrochromic panel described herein, and two commercially available electrochromic panels.

FIG. 7B shows a graph illustrating the fast switching (i.e., short switching time, or fast switching speed) of the electrochromic panels described in this invention (i.e., "Single" and "Double" panels in FIG. 7B). Two different inventive panels are shown. The "Single" panel has one electrochromic device, and the "Double" panel has two electrochromic devices in the panel. The "Commercial 1" and "Commercial 2" panels shown in FIG. 7B are commercially available electrochromic panels with areas approximately 3'×5'. The switching speed (i.e., switching time) of the Single and Double panels are significantly faster because they both have gradient transparent conductive layers. The Prior Art panels shown in FIG. 7B have switching speeds greater than approximately 600 seconds. The Single and Double inventive panels in this example both have switching speeds below approximately 100 seconds. Furthermore, the 50% partial switching time (i.e., the time to transition from the clear state to a state where the Tvis is 50% of the full absolute percentage range from clear to dark) is from approximately 10 to approximately 30 seconds in the Single and Double inventive panels in this example. The 50% partial switching time of the Prior Art panels in this example are from approximately 250 to approximately 450 seconds.

The Single panel in the example shown in FIG. 7B switches from a clear state with a Tvis of approximately 73% to a Tvis below 10% in approximately 100 seconds. The Tvis of the dark state of this panel is approximately 4%. Therefore, the switching time (i.e., the amount of time required for the electrochromic panel to transition from the clear state to a tinted state, over a Tvis range that is 90% of the full absolute percentage range from clear to dark, or in this case the amount of time to switch from approximately 73% to approximately 11%) is approximately 100 seconds.

The Double panel in the example shown in FIG. 7B switches from a clear state with a Tvis of approximately 61% to a Tvis below 10% in approximately 50 seconds. The Tvis of the dark state of this panel is approximately 0%. Therefore, the switching time (i.e., the time to witch from approximately 61% to approximately 6%) is approximately 50 seconds.

Figure 8:
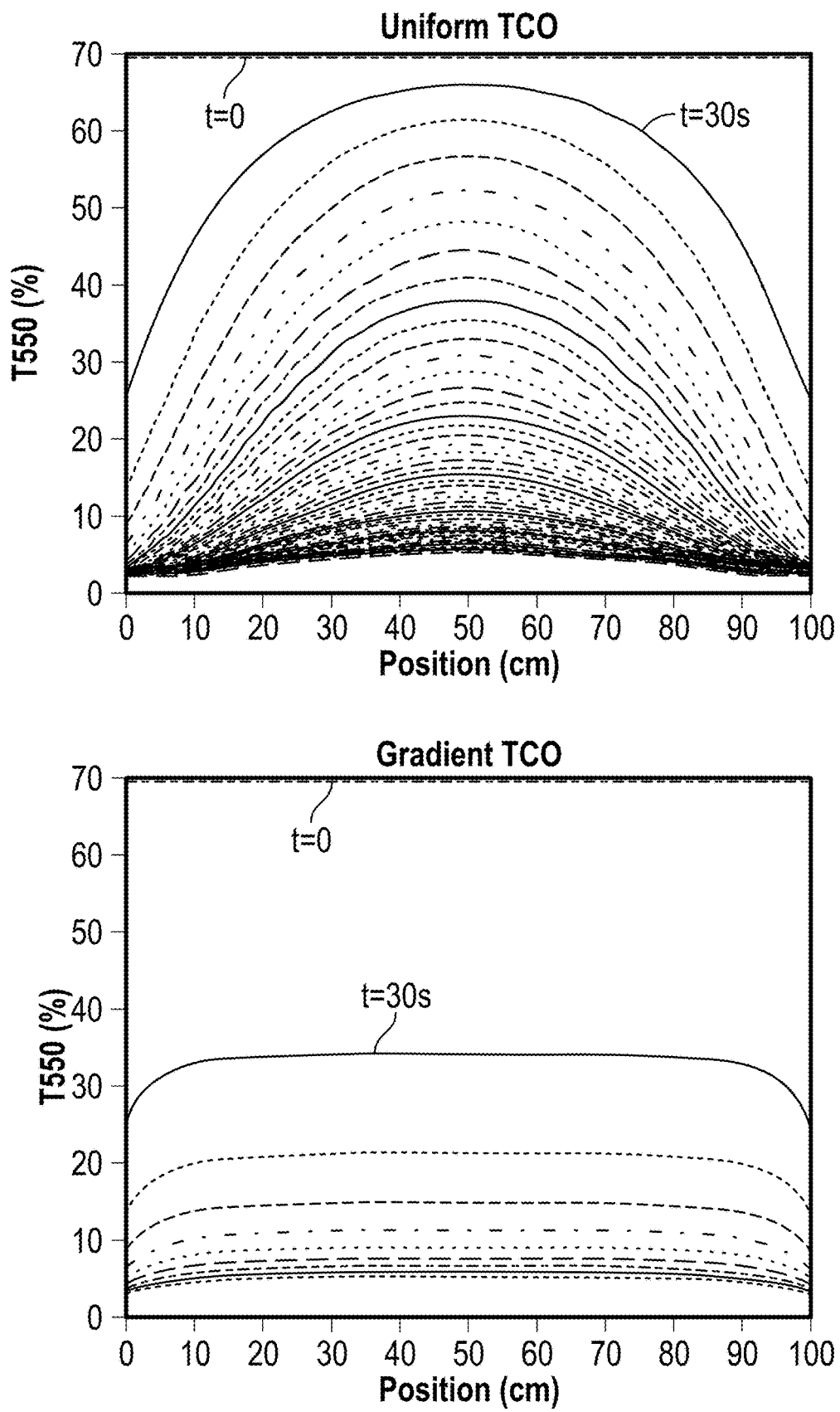
FIG. 8 shows modeling results for the transmission uniformity at 550 nm wavelength light across an electrochromic panel with a uniform transparent conducting layer (TCO) and a non-uniform gradient TCO with spatially varying sheet resistance, or with resistance to current flow substantially parallel to a major surface of the layer that varies as a function of position within the electrically conductive layer.

FIG. 8 provides a comparison of an electrochromic device having a uniform transparent conductive oxide (TCO) to an electrochromic device having a gradient transparent conducting layer, which is a gradient TCO in this example. The graphs 810 (uniform TCO) and 820 (gradient TCO) show the modeled visible transmittance at 550 nm wavelength of light (i.e., T550) on the y-axis at positions across the device in distance (centimeters). The model was created by determining the voltage drop at each point along the device for the Uniform TCO and Gradient TCO cases. The voltage drop was then used to calculate an amount of charge injected into the device at different positions for a constant applied current between electrical contacts located at the edges of the device. Finally, the change in transmission over time was calculated based on the coloration efficiency for the electrochromic layers of each device. The coloration efficiencies of the electrochromic materials within the devices will in general affect the degree of non-uniformity in transmission for the Uniform TCO and Gradient TCO devices in the model, with a higher coloration efficiency producing a more uniform transmission across the device. The multiple lines represent the electrochromic devices at different times in 30 second increments as the devices switched from the clear state to the dark state. From the comparison of these two graphs for the two electrochromic panels having uniform and gradient transparent conductive layers the transmittance across the entire panel having the gradient TCO is far more uniform than the panel without the gradient TCO.

The electrochromic device with the gradient TCO in the example shown in FIG. 8 transitioned from a clear state with a T550 of roughly 70% to a T550 of less than 5% with a switching speed less than 5 minutes. On the other hand, the electrochromic device with the uniform TCO in the example shown in FIG. 8 transitioned from a clear state with a T550 of roughly 70% to a T550 of roughly 5% with a switching speed of more than 20 min. Additionally, the tinted states during switching were considerably more uniform for the device with the gradient TCO compared to the device with the uniform TCO. Approximately 1 minute after commencing switching, the device with the uniform TCO had a T550 near the edges of approximately 15% and a T550 near the center of the device of approximately 65%, which was a 50% absolute difference in T550 from center to edge in the device. The gradient TCO had a much lower difference in T550 from center to edge. Approximately 1 minute after commencing switching, the device with the gradient TCO had a T550 near the edges of approximately 15% and a T550 near the center of the device of approximately 20%, which was only a 5% absolute difference in T550 from center to edge in the device.

FIG. 9 shows computer simulation results for electrochromic panels having the dimensions of 800 mm×1300 mm with gradient transparent conducting layers, which in this case are gradient transparent conducting oxides (i.e., Gradient TCO), compared to panels having no gradient TCO (or uniform TCO.) The model used to generate these results is described above, with reference to the plots in FIG. 8. This figure highlights the improved switching speed provided by the gradient TCO in larger scale electrochromic panels (e.g., having the dimensions of 800 mm×1300 mm). In the first row data are included for an electrochromic panel having a uniform TCO with a sheet resistance of 15 ohms/square across the area of the device. It has a switching speed of 17 minutes. The electrochromic devices in rows 2 and 3 have gradient TCO layers where the resistance across the area of the device varies from 15 ohms/square to 450 ohms/square. The electrochromic device of row 2 has a switching speed of 5 minutes and the electrochromic device of row 3 has a switching speed of 6 minutes using slightly less voltage and current.

Figure 10:
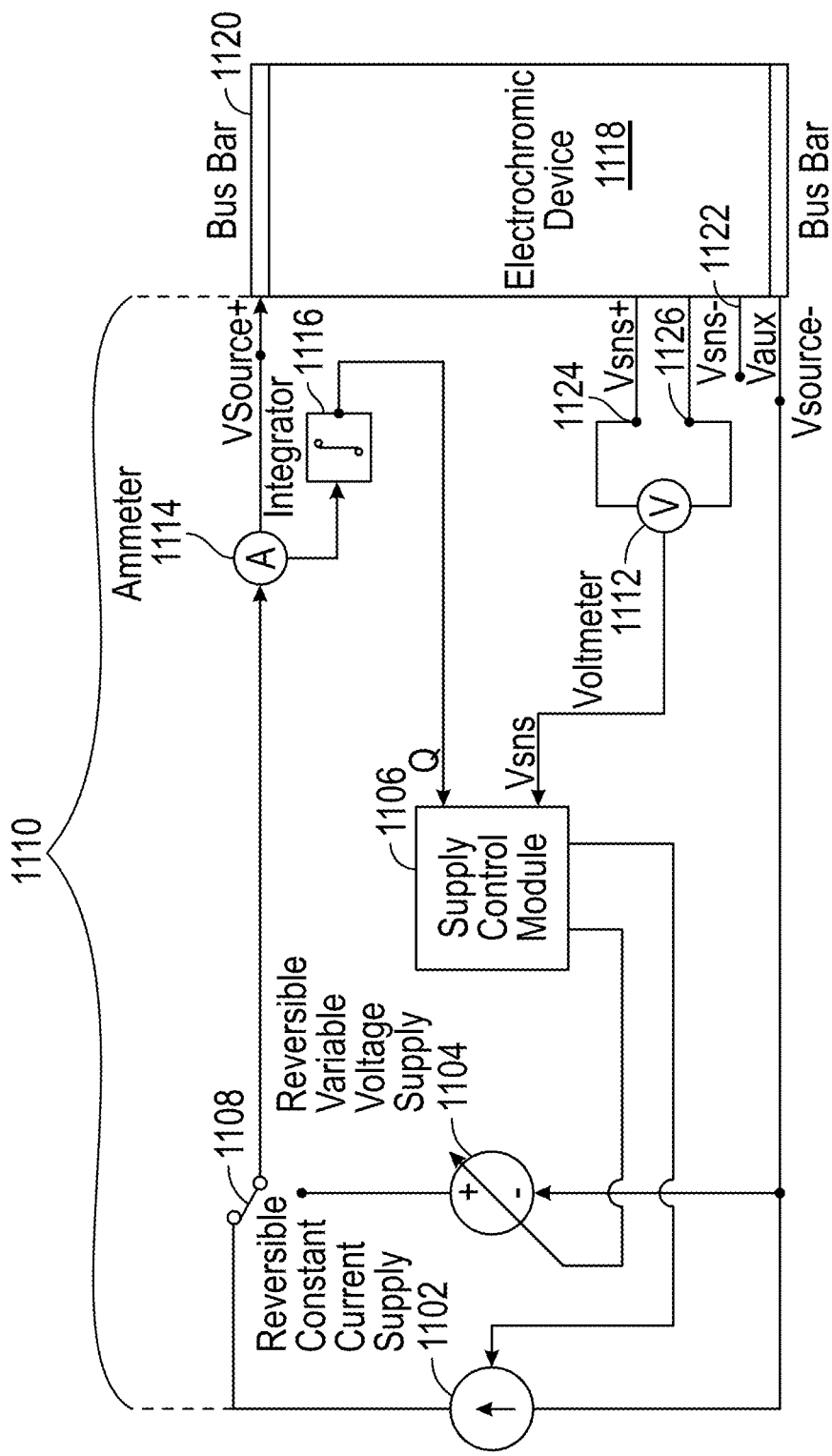
FIG. 10 is a system diagram of a driver and an electrochromic device, in accordance with an embodiment of the present disclosure.

The switching speed of the electrochromic panels is further optimized through the use of a proprietary drive circuit and drive scheme as illustrated in FIG. 10 and as described in more detail in U.S. patent application Ser. No. 14/994,091 entitled "Driver for Electrochromic Glass Unit", incorporated herein by reference. To summarize, the Vsense leads 1124 (Vsns+) and 1126 (Vsns−) allow for the constant monitoring of the voltage of the electrochromic device 1118 independent of the potential applied to the bus bars 1120. In some embodiments, the Vsense leads 1124 and 1126 are distinct from the bus bars 1120, and are located elsewhere than a location of the bus bars 1120. For example, the sense voltage terminals 1124 and 1126 could be connected to an interior region of the electrochromic device 1118, or various sense voltage terminals 1124, 1126 could be located along one or more edges of the electrochromic device 1118. The Vsense leads can provide feedback to control the voltage applied to the electrochromic device 1118 from VSource to the busbars 1120. This driver and drive scheme also allows for the selection of any tint state along a continuum of tint states between the dark state and the clear state. In some embodiments, the driver and drive scheme does not depend upon a "look-up" table of voltages to switch the panel to a clear state, dark state, or tinted state, but the amount of current and/or voltage applied to the bus bars is instead varied during switching. In some embodiments, the current and/or voltage applied to the bus bars is controlled in real-time by a user.

The cross-section 501 of FIG. 5 also includes electrochromic electrodes, an anode 530 and a cathode 540. The anode and cathode materials used are the main factors in influencing the CIE-Lab characteristics of the electrochromic panel. In some embodiments, the cathode material 540 for devices described herein is tungsten trioxide. Tungsten trioxide ($WO_3$) is a common cathode material and is very clear in the clear state and contributes a significant blue color in the dark state. In some embodiments, the very clear clear state is maintained, and the blue color of the dark state is neutralized by tuning the anode material composition and crystal structure accordingly. In some embodiments, the anode material for the devices described herein is a lithium nickel oxide material that includes one or more transition metal elements (LiNiMOx). In some embodiments, to obtain a color neutral and transparent clear state and a color neutral dark state, the crystalline structure of the LiNiMOx material is important as is the selection of the transition metal elements. The anode and cathode materials used in the experimental data provided in this description were prepared using sol-gel deposition methods, and additionally, similar device and panel properties are achievable using particle-based inks that are deposited and dried on the substrates 510. The sol-gel deposition techniques are described in United States patent applications US 2014/0205746 and US 2014/0205748 "Process For Preparing Lithium Nickel Oxides", incorporated by reference herein. The LiNiMOx materials are described in U.S. Pat. No. 9,207,514 "Electrochromic Lithium Nickel Group 4 Mixed Metal Oxides", in U.S. Pat. No. 9,256,111 "Electrochromic Lithium Nickel Group 5 Mixed Metal Oxides", and US patent application number US 2014/0272394 (each incorporated by reference herein.) In some embodiments, the electrochromic device of 500 and cross-section 501 is completed by the ion conductor, which is placed between the anode and cathode. The selection of the ion conductor material is also a factor in the CIE-Lab color characteristics of the electrochromic panel. In some embodiments, an ion conductor that is very transparent and will not change color over time is selected for the electrochromic devices described herein. In some embodiments, the utilization of the cathode, anode and ion conductor materials described above produces electrochromic devices and panels with high transparency in the clear state and a neutral color.

FIG. 5 also shows a sequestration portion 560 along one edge of the electrochromic panel 560, in an embodiment. Sequestration is a chemical and/or electrical method to remove and/or restore ions to the anode, cathode and/or ion conductor. Over time there may be ionic build-up or depletion in the anode and/or cathode which can cause discoloration or performance issues. In one embodiment, excess lithium ions may build up in a LiNiOx anode due to the release of lithium from the composition. Sequestration can enable sustained clarity of electrochromic panels by correcting any discoloration over time, and also can be used to match the coloration and performance of groups of windows. In some embodiments, the electrochromic devices and/or panels described herein include one or more sequestration elements to maintain the clear state and the dark state CIE-Lab L*, a*, b* and/or Tvis values over time. Various embodiments of sequestration are described in more detail in application Ser. No. 14/994,087 entitled "Electrochromic multilayer devices with charge sequestration and related methods" and incorporated by reference herein. Also, in a multi-pane device an advantage is that one device can sequester in the clear state to sequester excess lithium from the anode and/or cathode while maintaining some level of shading and/or privacy by keeping the other pane in the dark state.

A multi-pane electrochromic device may be used for the purpose of privacy glass where the multi-pane device is made by laminating at least two electrochromic devices together with a transparent laminate material such as polyvinylbuterate (PVB) to form a laminated glass unit that may be integrated into a frame for use in interior partitions. A laminated glass unit may also be integrated into an Integrated Glass Unit (IGU.) Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. An electrochromic panel, comprising:
a first electrochromic device comprising a clear state and a dark state, wherein transition from the clear state to the dark state is controlled through application of a voltage to the electrochromic panel without application of Ultraviolet radiation and, wherein
the clear state comprises an L* value in transmission from 70 to 95, a b* value in transmission from −8 to 8, and an a* value in transmission from −4 to 4, wherein the L* value, the b* value, and the a* value are each defined according to the CIE-Lab color space.

2. The electrochromic panel of claim 1, wherein the clear state comprises a visible transmittance ($T_{vis}$) from 70% to 80%.

3. The electrochromic panel of claim 1, wherein the dark state comprises an L* value in transmission from 0 to 30, a b* value in transmission from −5 to −2, and an a* value in transmission from −7 to −5.

4. The electrochromic panel of claim 1, further comprising a plurality of tinted states between the clear state and the dark state, wherein the plurality of tinted states are along a continuum of tints, and the panel has a delta E in transmission of less than 10 in the clear state, the dark state, and at all tinted states, across the panel in all dimensions, wherein delta E is a difference in color in the CIE-Lab color space, and is defined as:

$$\Delta E = \sqrt{(L_2^* - L_1^*)^2 + (a_2^* - a_1^*)^2 + (b_2^* - b_1^*)^2}.$$

5. The electrochromic panel of claim 4, wherein the plurality of tinted states comprise a visible transmittance ($T_{vis}$) of between 0.01% and 80%.

6. The electrochromic panel of claim 4, further comprising at least one gradient transparent conductive layer.

7. The electrochromic panel of claim 1, further comprising at least one sequestration element.

8. The electrochromic panel of claim 3, further comprising a sequestration element to maintain the clear state b* values in transmission and the clear state L* values in transmission over time.

9. The electrochromic panel of claim 1, wherein the first electrochromic device is integrated into an insulated glass unit.

10. The electrochromic panel of claim 1, wherein the first electrochromic device is integrated into an interior partition unit.

11. An electrochromic panel, comprising:
a first electrochromic device, the first electrochromic device comprising a first clear state and a first dark state, wherein transition from the first clear state to the first dark state is controlled through application of a voltage to the electrochromic panel without application of Ultraviolet radiation and;
a second electrochromic device laminated to the first electrochromic device such that incident light passes through both the first electrochromic device and the second electrochromic device, the second electrochromic device comprising a second clear state and a second dark state, wherein
the first clear state and the second clear state in combination comprise a visible transmittance ($T_{vis}$) greater than 55%, a b* value in transmission from −8 to 8, and an a* value in transmission from −5 to 5, wherein the b* value and the a* value are each defined according to the CIE-Lab color space.

12. The electrochromic panel of claim 11, wherein the first dark state and the second dark state in combination comprise, a b* value in transmission from −8 to 8, and an a* value in transmission from −8 to 8.

13. The electrochromic panel of claim 12, further comprising a plurality of tinted states between the first clear state and the first dark state, wherein the plurality of tinted states are along a continuum of tints, the panel has a delta E in transmission of less than 10 in the first clear state, the first dark state, and at all of the plurality of tinted states, across the panel in all dimensions, wherein delta E is a difference in color in the CIE-Lab color space, and is defined as:

$$\Delta E = \sqrt{(L_2^* - L_1^*)^2 + (a_2^* - a_1^*)^2 + (b_2^* - b_1^*)^2}.$$

14. The electrochromic panel of claim 13, wherein the plurality of tinted states comprise a visible transmittance ($T_{vis}$) from 0.01% to 50%.

15. The electrochromic panel of claim 13, further comprising an at least one gradient transparent conductive layer.

16. The electrochromic panel of claim 11, further comprising at least one sequestration element.

17. The electrochromic panel of claim 12, further comprising a sequestration element to maintain the first clear state and the first dark state b* values and the first clear state and the first dark state a* values over time.

18. The electrochromic panel of claim 12, wherein the panel is integrated into an insulated glass unit.

19. The electrochromic panel of claim 12, wherein the panel is integrated into an interior partition unit.

20. A method of operating an electrochromic panel, comprising:
switching between a dark state comprising a visible transmittance ($T_{vis}$) of less than 3% and a b* value in transmission from −8 to −8 and a clear state comprising a visible transmittance ($T_{vis}$) of greater than 55% and a b* value in transmission from −8 to 8, wherein the b* value and an a* value are each defined according to the CIE-Lab color space.

21. The method of claim 20, further comprising:
switching between the dark state and a plurality of tinted states between the clear state and the dark state, wherein the plurality of tinted states are along a continuum of tints, wherein the tinted states have delta E in transmission less than 10, wherein delta E is a difference in color in the CIE-Lab color space, and is defined as:

$$\Delta E = \sqrt{(L_2^* - L_1^*)^2 + (a_2^* - a_1^*)^2 + (b_2^* - b_1^*)^2}.$$

22. The method of claim 20, further comprising:
switching between the clear state and a plurality of tinted states between the clear state and the dark state, wherein the plurality of tinted states are along a continuum of tints, wherein the tinted states have delta E in transmission less than 10, wherein delta E is a difference in color in the CIE-Lab color space, and is defined as:

$$\Delta E = \sqrt{(L_2^* - L_1^*)^2 + (a_2^* - a_1^*)^2 + (b_2^* - b_1^*)^2}.$$

23. The method of claim 20, wherein the switching comprises a switching speed between the clear state and the dark state, or between the dark state and the clear state, of less than 2 minutes.

* * * * *